H. B. TAYLOR.
MOTOR REVERSING MEANS.
APPLICATION FILED FEB. 23, 1912.
1,080,026.
Patented Dec. 2, 1913.
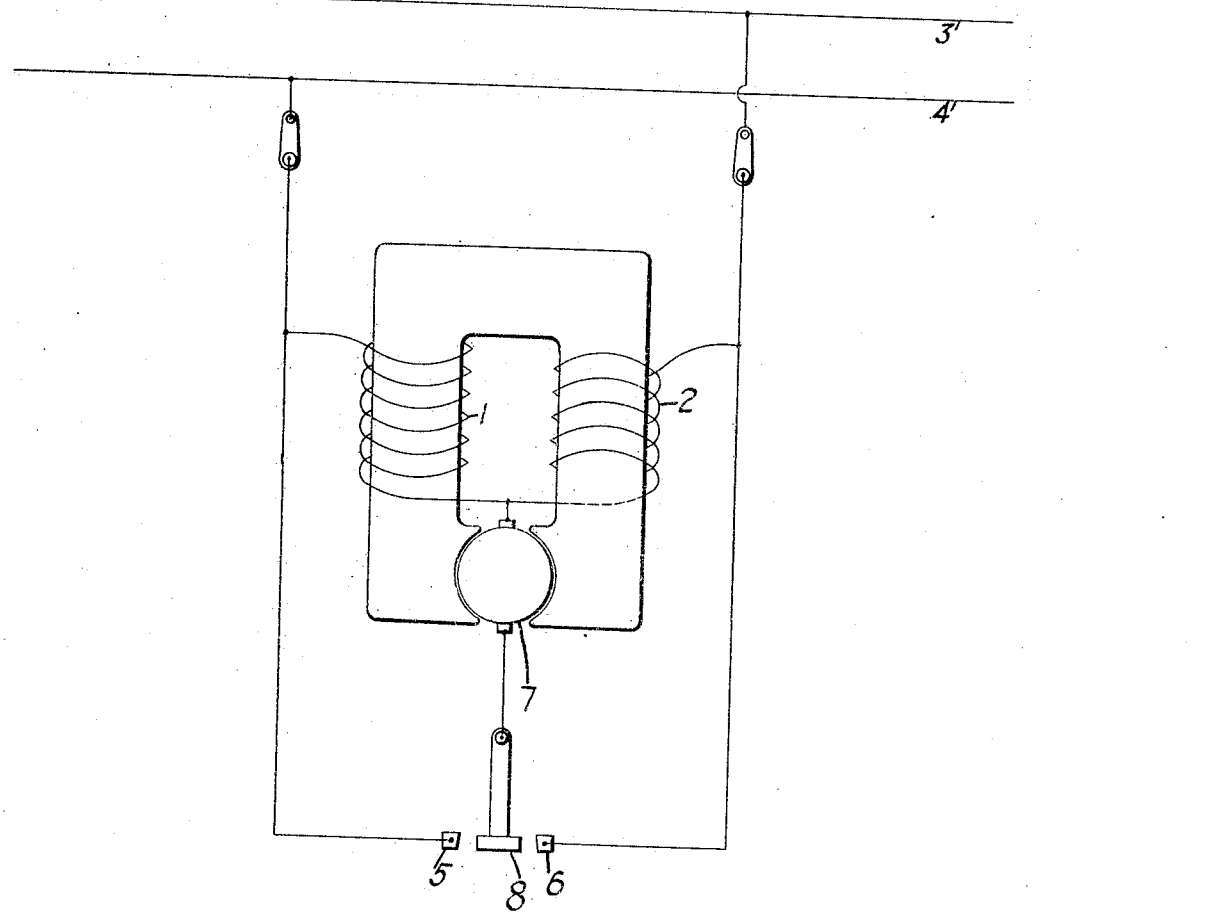

UNITED STATES PATENT OFFICE.

HAROLD B. TAYLOR, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-REVERSING MEANS.

1,080,026.  Specification of Letters Patent.  Patented Dec. 2, 1913.

Application filed February 23, 1912. Serial No. 679,285.

*To all whom it may concern:*

Be it known that I, HAROLD B. TAYLOR, a citizen of the United States, and a resident of Wilkinsburg, in the county of Allegheny and State of Pennsylvania, have invented a new and useful Improvement in Motor-Reversing Means, of which the following is a specification.

My invention relates to means for controlling the direction of rotation of the armature of an electric motor, and it has for its object to so arrange the circuit connections of a motor that a very simple controller may be employed to reverse the direction of current flow in the armature and thereby reverse its direction of rotation, the total field magnet winding being active for both directions of rotation, whereby its weight and dimensions may be relatively small.

In the single figure of the accompanying drawing, which diagrammatically illustrates a system of connections of a motor embodying my invention, the entire field magnet winding of the motor, comprising coils 1 and 2, is directly connected between conductors 3 and 4 of a suitable supply circuit, the said conductors being also respectively connected to stationary contact members 5 and 6 of a reversing controller which may be actuated, either manually or automatically, by any suitable means (not shown), such as relays or mechanical devices.

One terminal of the armature 7 of the motor is connected to an intermediate point of the field magnet winding, such as to the connection between the two coils that surround the opposite legs or poles of the magnet, and the other terminal of the armature is connected to a movable contact member 8 of the controller that is adapted to engage the one or the other of the stationary contact members 5 and 6, according to the desired direction of rotation of the motor armature.

During the use of the device, the entire field magnet winding is connected between the circuit conductors 3 and 4 and, consequently, it remains continuously active. When the contact member 8 does not engage either of the stationary contact members 5 or 6, the armature 7 remains stationary, but if it is caused to engage the member 5, the armature will be connected in parallel with the field magnet coil 1 and in series with the coil 2, whereas, if it is caused to engage the contact member 6, the armature will be connected in series with the coil 1 and in parallel with the coil 2, the directions both of current flow therein and of rotation being reversed.

Since the field magnet winding is used in its entirety, rather than one portion thereof for one direction of rotation and another portion thereof for the opposite direction of rotation, a minimum amount of field magnet winding is necessary, and, consequently, the motor may be small and compact. Furthermore, since the circuits which are broken by disengagement of the contact member 8 from the stationary members 5 and 6 are shunt circuits, the amount of sparking between the said terminals is very much less than would occur if the entire circuit were interrupted, and there is consequently little danger of injuring the contact members by such sparking.

I claim as my invention:

1. The combination with an electric motor having one terminal of its armature connected to an intermediate point of its field magnet winding, of a controlling device comprising a single contact member that is connected to the other terminal of the armature and is relatively movable between and adapted to engage the one or the other of two other members that are respectively connected to the terminals of the field magnet winding.

2. The combination with an electric motor having one terminal of its armature connected to an intermediate point of its field magnet winding, of a single movable contact member for connecting the other terminal of the armature to the one or the other terminal of the field magnet winding.

3. The combination with an electrical circuit, and a motor having its field magnet winding connected between the circuit conductors and having one terminal of its armature connected to an intermediate point of the field magnet winding, of a controlling device comprising a contact member that is connected to the other terminal of the armature and is relatively movable to engage the one or the other of two other members that are respectively connected to the circuit conductors.

4. The combination with an electrical circuit, and a motor having its field magnet winding connected between the circuit conductors and having one terminal of its armature connected to an intermediate point of the field magnet winding, of means for connecting the other terminal of the armature to the one or the other conductor of the circuit.

In testimony whereof, I have hereunto subscribed my name this 20th day of February, 1912.

HAROLD B. TAYLOR

Witnesses:
 PAUL MacGAHAN,
 B. B. HINES.